(12) United States Patent  
Lor et al.

(10) Patent No.: US 7,920,548 B2  
(45) Date of Patent: Apr. 5, 2011

(54) INTELLIGENT SWITCHING FOR SECURE AND RELIABLE VOICE-OVER-IP PBX SERVICE

(75) Inventors: Kar-Wing Edward Lor, Castro Valley, CA (US); Wing Hei Luk, Hong Kong SAR (CN); Kwan Shum, Hong Kong SAR (CN)

(73) Assignee: Hong Kong Applied Science and Technology Research Institute Co. Ltd., Kong Kong SAR (HK)

( * ) Notice: Subject to any disclaimer, the term of this patent is extended or adjusted under 35 U.S.C. 154(b) by 1534 days.

(21) Appl. No.: 11/206,085

(22) Filed: Aug. 18, 2005

(65) Prior Publication Data

US 2007/0041373 A1 Feb. 22, 2007

(51) Int. Cl.  
*H04L 12/66* (2006.01)

(52) U.S. Cl. ............... 370/352; 370/354; 379/220.01; 379/229

(58) Field of Classification Search ............ 370/338, 370/352–354; 379/220.01, 229  
See application file for complete search history.

(56) References Cited

U.S. PATENT DOCUMENTS

| 7,411,975 | B1 * | 8/2008 | Mohaban | 370/466 |
| 2003/0117986 | A1 * | 6/2003 | Thermond et al. | 370/338 |
| 2004/0148374 | A1 | 7/2004 | Bush et al. | |
| 2004/0255154 | A1 * | 12/2004 | Kwan et al. | 713/201 |
| 2005/0063359 | A1 * | 3/2005 | Jagadeesan et al. | 370/352 |
| 2006/0077960 | A1 * | 4/2006 | Chang et al. | 370/352 |

FOREIGN PATENT DOCUMENTS

| CN | 1650655 A | 8/2005 |
| WO | 2004/098152 A1 | 11/2004 |

OTHER PUBLICATIONS

International Search Report.

* cited by examiner

*Primary Examiner* — Ahmad F Matar  
*Assistant Examiner* — Khai N Nguyen  
(74) *Attorney, Agent, or Firm* — Buchanan Ingersoll & Rooney PC

(57) ABSTRACT

A switching apparatus for switching packetized voice traffic between a plurality of communication devices, the switching apparatus comprises a multi-layer switch, a plurality of communication ports, control means and ingress processing means, said packetized voice traffic comprises call control packets and medium packets which are exchanged between the communication devices via said communication ports, wherein medium packet traffic from a first communication device to a second communication device is split into a first call segment and a second call segment, the first call segment originates from said first communication devices and terminates at said switching apparatus, the second call segment originates from said switching apparatus and terminates at said second communication device, each medium packet from said first communication device is processed by said ingress processing means of said switching apparatus before onward transmission to said second communication device.

20 Claims, 6 Drawing Sheets

Voice Subnet: $IP^{F1}$, $IP^{F2}$, $IP^{F3}$, $IP^{F4}$, $IP^{SW}$
Data Subnet: $IP^{PC1}$, $IP^{PC2}$

INTELLIGENT SWITCHING FOR SECURE AND RELIABLE VOICE-OVER-IP PBX SERVICE

FIELD OF THE INVENTION

This invention relates to voice communication and, more particularly, to switching of packetized voice traffic between communication networks. More specifically, this invention relates to switching of packetized voice traffic over private communication networks using VoIP.

BACKGROUND OF THE INVENTION

The rate of growth of voice traffic on computer data communication networks has been phenomenal since the last decade of the last century. In contrast to conventional voice communication systems in which voice is carried as a stream of synchronous data over PSTN networks by circuit switching using time-division multiplexing (TDM), computer networks typically carry voice traffic primarily as data packets over packet switched data networks. This form of voice traffic is commonly referred to as packetized voice traffic because packets of voice data form the basis of communication. Because of the various advantages of using private internal networks, such as LANs, to carry packetized voice traffic in an enterprise environment, as compared to the use of conventional stand-alone and dedicated PABX systems for internal voice traffic switching, internal networks carrying packetized voice traffic are increasingly used by enterprises to replace dedicated PABX systems. Examples of such advantages include more convenient and efficient system management since a single network infrastructure can be shared by both voice and data traffic and enhanced scalability.

An important application of packetised voice data traffic is the carrying of voice over the Internet. The Voice Over Internet Protocol (VoIP) is widely accepted as the industrial standard protocol for such purposes. Nowadays, VoIP as a transmission protocol has found wide applications in both internet and non-internet applications. For example, VoIP is also used in packetized voice data communication applications in private communication networks. Hence, the term VoIP and the standard protocol itself is no longer restricted to voice communication over the Internet and the description below should be understood on that basis.

VoIP, especially VoIP using Session Initiation Protocol (SIP), is becoming increasingly important for enterprises phone applications because quality voice traffic can be provided at lower costs, with enhanced flexibility and controllability. However, security and reliability remain the major concerns and these might have prevented a large-scale deployment of IP telephony in commercial or enterprise environment thus far.

Typically, an IP telephony network is built on top of or embedded in the enterprise data network or LAN. This may be a result of maximising the utilisation of existing computer networks, or a preference for centralised and enhanced management of data and voice traffic within a corporate environment or other practical reasons. However, this conventional setup means outage of the data network, for example, due to hacking, will also result in the outage of the corporate telephone system which is clearly not acceptable.

Hence, it will be desirable if shortcomings of conventional VoIP networks can be alleviated so that a compromised data network (LAN or VLAN) will not adversely affect the IP-based voice network of an organisation which is physically connected with the data network. Consequently, a secure and reliable IP-based voice network can be deployed to take advantage of the Internet or other network or network protocols as and when available.

OBJECT OF THE INVENTION

Accordingly, it is an object of the present invention to provide an intelligent switch for packetized voice communication which alleviates at least some of the security shortcomings of conventional servers for packetized telephony. At a minimum, a useful choice of an intelligent switch for VoIP application is provided to the public.

SUMMARY OF THE INVENTION

According to a first aspect of the invention, there is provided a switching apparatus for switching packetized voice traffic between a plurality of communication devices, the switching apparatus comprises a multi-layer switch, a plurality of communication ports, control means and ingress processing means, said packetized voice traffic comprises call control packets and medium packets which are exchanged between the communication devices via said communication ports, wherein medium packet traffic from a first communication device to a second communication device is split into a first call segment and a second call segment, the first call segment originates from said first communication devices and terminates at said switching apparatus, the second call segment originates from said switching apparatus and terminates at said second communication device, each medium packet from said first communication device is processed by said ingress processing means of said switching apparatus before onward transmission to said second communication device.

According to a second aspect of this invention, there is provided a switching apparatus for switching packetized voice traffic between a plurality of communication devices, the switching apparatus comprises a multi-layer switch, a plurality of communication ports, control means and ingress filtering means, said packetized voice traffic comprises call control packets and medium packets which are exchanged between the communication devices via said communication ports, said ingress filtering means comprises means for policing data rate of call control packets wherein only call control packets of a data rate below a prescribed threshold rate are switched through said multi-layer switch.

According to another aspect of this invention, there is provided a communication network comprising the above switching apparatus.

According to a further aspect of this invention there is provided a method of switching packetised voice data traffic in a voice network from a first communication device to a second communication device via an intermediate switching apparatus, said method including the steps of:

(i) the intermediate switching apparatus receiving an incoming packet from the first communication device, wherein a source address of the incoming packet includes an address of the first communication device and a destination address of the incoming packet includes an address of the intermediate switching apparatus;

(ii) converting the destination address of the incoming packet to an address of the second communication device and converting the source address of the incoming packet to the address of the intermediate switching apparatus; and (iii) policing the bandwidth of incoming packets and blocking said incoming packets when the bandwidth exceeds a predetermined threshold which indicates that said incoming packets are non-voice packets;

when said incoming packet transits through the intermediate switching apparatus of said intermediate address, whereby subsequent traffic transits through said intermediate switching apparatus.

Preferably, said a call connection from a first communication device to a second communication device is divided into a first call segment and a second call segment, the first and second communication devices are respectively connected to a first communication port and a second communication port, the first call segment contains address identification of the first communication device as source, address identification of the switching apparatus as destination and port identification of the switching apparatus as an intermediate listening port, the second call segment contains address identification of the switching apparatus as source, address information of the second communication device as destination, and port identification of the second communication device as a destination listening port.

Preferably, a call connection from a second communication device to a first communication device is divided into a first call segment and a second call segment, the first and second communication devices are respectively connected to a first communication port and a second communication port, the first call segment contains address identification of the second communication device as source, address identification of the switching apparatus as destination and port identification of the switching apparatus as an intermediate listening port, the second call segment contains address identification of the switching apparatus as source, address information of the first communication device as destination, and port identification of the first communication device as a destination listening port.

Preferably, said address identification is an IP-address.

Preferably, said port identification is a Layer-4 port number.

Preferably, a call connection between a first communication device and a second communication device is established by passage of call control packets between said first communication device and a processing means and between said processing means and said second device to establish a call session.

Preferably, said switching apparatus precludes communication between devices unless a call session has been established.

Preferably, a call connection between a first communication device and a second communication device is established by passage of call control packets between said first communication device and a processing means and between said processing means and said second device to establish a call session.

Preferably, said switching apparatus comprises ingress filtering means for policing data rate of call control packets wherein only call control packets of a data rate below a prescribed threshold rate are switched through said multilayer switch.

Preferably, said ingress processing means comprises device authentication means for ascertaining the identities of one or more communication devices from which incoming data packets of a voice traffic are admitted by said switching apparatus for onward transmission to another communication device.

Preferably, voice traffic is based on session initiation protocol and said control means comprises means for splitting a call between two phone devices as a call comprising two call segments with said switching apparatus intermediate the two call segments, the first call segment is between a source communication device and the switching apparatus, the second call segment is between the switching apparatus and a destination communication device, the destination address of said first call segment and the source address of said second call segment are the address of the switching apparatus.

Preferably, in a voice VLAN formed by at least said switching apparatus and said communication devices, said switching apparatus precludes broadcast and multi-cast by any communication device.

Preferably, in a voice VLAN formed by at least said switching apparatus and said communication devices, said switching apparatus precludes unknown unicast.

BRIEF DESCRIPTION OF THE DRAWINGS

Preferred embodiments of the present invention will be explained in further detail below by way of examples and with reference to the accompanying drawings, in which:-

DETAILED DESCRIPTION OF THE PREFERRED EMBODIMENTS

Figure 1:
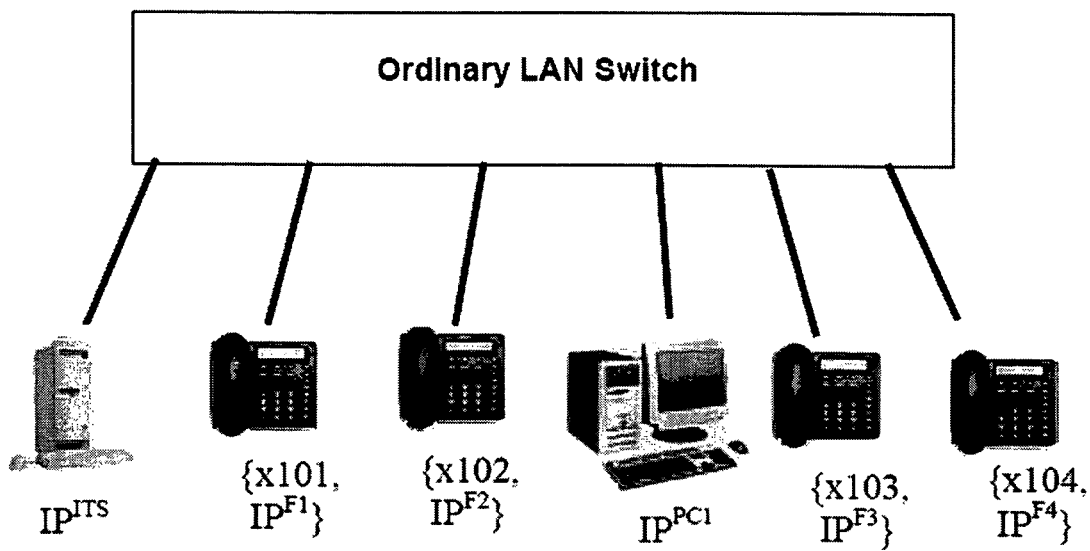
FIG. 1 shows an exemplary local area network (LAN) with converged data and VoIP applications connected to a conventional LAN switch and controlled by an IP telephony server.

An exemplary conventional voice communication network built on an exemplary local Area Network (LAN) and utilizing voice over Internet Protocol (VoIP) is shown in FIG. 1. The LAN comprises a Layer 2 LAN switch, a plurality of IP phone devices and an IP telephony server (ITS). Each IP phone device has a characteristic IP address $IP^{Fx}$ and an internal phone extension (for example 101, 102 in FIG. 3 of the instant example). The ITS is represented by an IP address ($IP^{ITS}$) and all the relevant network entities are connected to the LAN switch. Since all the entities are connected to the same data network, they are assigned IP addresses of the same IP subnet work. Throughout this specification, the term Layer means and refers to Layer as defined under the OSI (open system interconnection) protocol model, unless the context otherwise requires.

Figure 2:
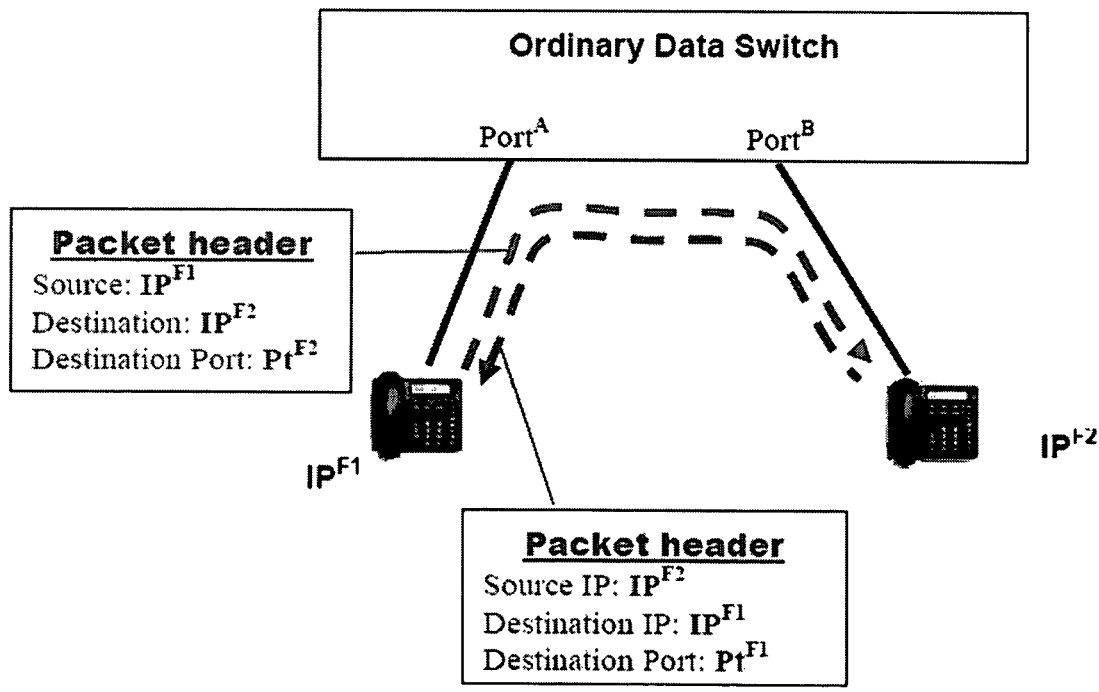
FIG. 2 illustrates an exemplary conventional VoIP call session in the network of FIG. 1.

In FIG. 2, an exemplary VoIP call between two IP phone devices F1 and F2 is illustrated. As is known to persons skilled in the art, each VoIP call is characterized by two types of traffic, namely, call control traffic and media traffic. In exemplary embodiment, voice traffic is the media traffic and the media traffic is switched or routed from one designated port to another designated port after a voice call connection has been set up by a VoIP server. After a call has been set up, media streams are switched. In addition, each media stream originates from one user and terminates at the other users.

Figure 3:
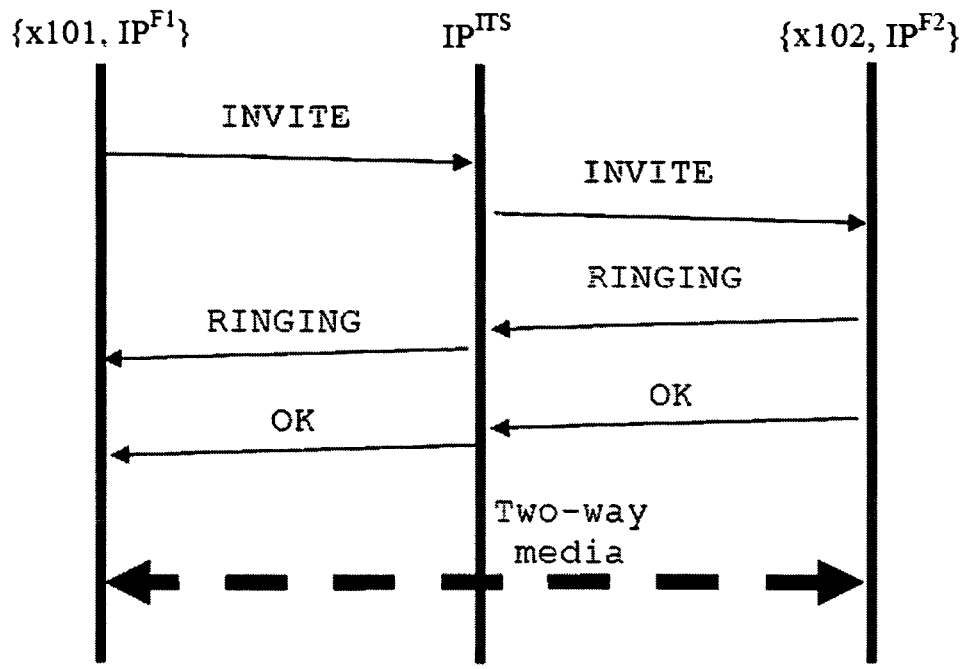
FIG. 3 illustrates an exemplary call setup sequence using SIP in the network of FIG. 1.

A standard sequence of call setup message exchange and the subsequent media communication path between the phone devices in accordance with the session initiation protocol (SIP) is shown in FIG. 3. Naturally, it would be appreciated that the SIP protocol is used a convenient example since it is one of the prevailing standards. In any event, it should be appreciated that application of this invention shall not be limited to any specific protocols such as SIP and shall extend to other protocols with similar or equivalent features.

During the initial exchange of call setup messages, each IP phone will negotiate for a Layer 4 Port (L4P) with the other phone for the transmission of voice media for a specific session. The L4P is usually a number between 1024 and 65535. An IP phone will set aside that specific port as the listening port and all incoming voice packets of this voice session will have this L4P as the destination user datagram protocol (UDP) port number. This port will be in effect for the entire duration of a call which is referred to a call session. When a call session is finished, the Layer 4 port will be released. In an ordinary VoIP call setup, it is also possible for a phone to call another phone directly in a point-to-point mode and without the involvement of an ITS.

Networking security, device authenticity and application security are the more notable security issues for a communication network carrying both data and voice traffic. In particular, networking security concerns with security of the data network on which voice traffic is carried. Device authenticity concerns with the identification of bona-fide devices which are acceptable into the network. Application security concerns with security loop-holes at the application level.

In a data network, it is known that the data link layer is the most vulnerable to attack. In addition, security threats by internal hackers are usually of more concern than threats by external hackers. In a conventional enterprise setup, voice and data traffic are usually carried by a single physical network, such as a local area network (LAN). In a first step towards the implementation of a secured voice network while retaining the benefits of a single physical network, a physical LAN is segregated into a voice network and a data network to mitigate the risks of such internal threats. The segregation can be physical or logical, although logical segregation is preferred so that the advantages of a single physical network can be maximised.

With data and voice network segregation, data traffic and packetised voice traffic can be carried in their respective networks so that non-voice data in the data network will not be allowed to cross into the voice network. Thus, even if the data network is paralysed by hackers, the voice network can still be operational.

In the specification below, a preferred embodiment of an intelligent switch will be described with reference to an exemplary LAN which is logically segregated into a voice network and a data network. Specifically, the physical LAN is logically segregated into a voice sub-network and a data sub-network by adopting Virtual LAN (VLAN) topology or other appropriate techniques. A description of appropriate VLAN techniques can be found in, for example, "IEEE Standard for Information technology—Telecommunications and information exchange between systems—IEEE standard for local and metropolitan area networks—Common specifications—Part 3: Media access control (MAC) Bridges, ANSI/IEEE Std 802.1D, 1998 Edition" and this documentation is incorporated herein by reference.

By employing VLAN partitioning techniques, a single physical LAN is partitioned into a plurality of logically segregated LANs or sub-LANs. Segregation of the network into voice and data sub-networks at Layer 2 and beyond would ensure that ordinary data traffic in the data network cannot cross over into the voice network to damage the voice network. More particularly, the voice network and the data network are totally segregated by having two logically separated networks. This will mitigate risks of adverse influence on the voice network due to security hazards in the data network. Similar to other common LAN environments, for example, DHCP, DNS, SNMP, etc., two sets of servers, namely, one for ordinary data traffic control and another for voice traffic control are provided.

An Exemplary Network Configuration

Figure 4:
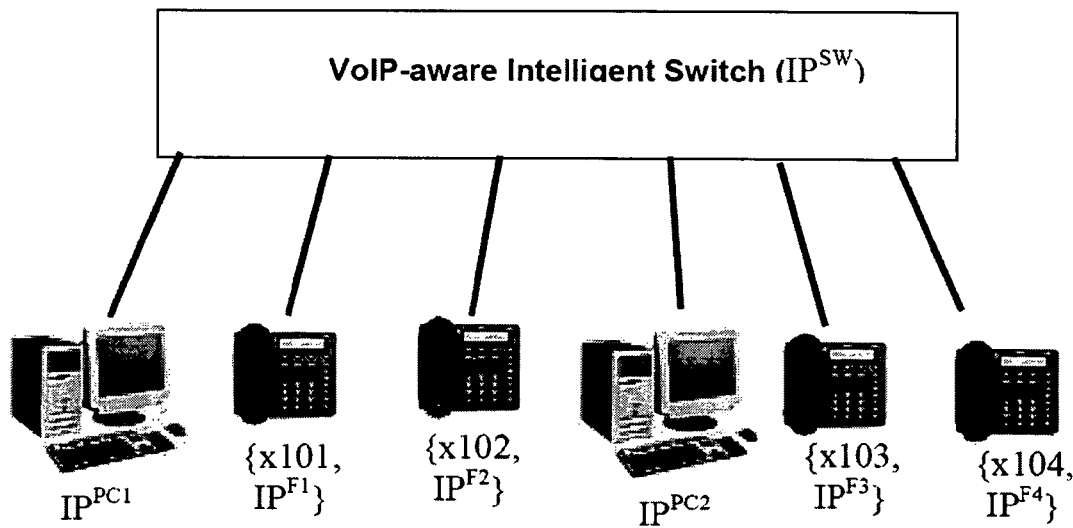
FIG. 4 shows an exemplary voice and data network configuration segregated by an intelligent switch of this invention.

An exemplary network configuration employing an intelligent VoIP aware switching apparatus ($IP^{SW}$) of this invention (the "intelligent switch") is shown in FIG. 4. The network comprises a voice sub-network and a data sub-network. The voice sub-network and the data sub-network are connected and segregated by the intelligent switch $IP^{SW}$. In this example, the intelligent switch conveniently provides the additional functions of an IP telephony server (ITS) and a private branch exchange (PBX). These functions are meant to process all the call control of the SIP sessions, including all establishments, call teardown and PBX-type call features. In the description below, the invention will be explained with reference to exemplary devices connected to the exemplary voice sub-network and data sub-network devices which are set out below.

a) voice sub-network: $IP^{F1}$, $IP^{F2}$, $IP^{F3}$ & $IP^{F4}$; and
b) data subnet: $IP^{PC1}$ & $IP^{PC2}$.

Security Strategy Overview

In order to enhance security in the segregated voice network coupled with an efficient utilization of the intelligent switch, a set of security policies are implemented at the intelligent switch. Some examples of appropriate security policies are as follows.

1. Only voice traffic from an authenticated and/or recognized user is admitted into the voice network and all admission of voice traffic into the voice network must be through the intelligent switch. For example, only pre-registered devices with recognized MAC addresses are admitted into the voice network.
2. non-voice related data packets are prohibited in the voice LAN.
3. Voice traffic between two voice devices is allowable only after a voice connection has been established. In other words, voice traffic is not allowable between two voice devices within the network unless and until a voice connection has been set up by the intelligent switch.
4. Broadcast, unknown unicast between ports, multicast and flooding are prohibited in the voice network by the intelligent switch. In typical voice network, broadcast traffic is always kept to a minimum. For example, ARP (Address Resolution Protocol) broadcasts and unknown unicast traffic are common in a network. Although such traffic are usually of a low volume, a malicious client can nevertheless generate an enormous amount of such traffic to hamper the normal operation of the network. Therefore, such broadcast has to be prohibited for enhanced security.
5. Voice traffic is rate monitored by the intelligent switch, only traffic below a predetermined bandwidth is allowed.

A Multi-Layer, Session-Based Switch for Secured VoIP Service

An exemplary implementation of the above security strategy is illustrated below with reference to an exemplary network of FIG. 4. The network comprises logically segregated voice and data networks which are connected by an intelligent switch of this invention. The intelligent switch, or Voice Data Switch ("VDS") is built on a hardware-based multilayer switching core and incorporating novel features of this invention. The multi-layer switching core comprises means for switching packetized data at Layer 2 and beyond, including Layer 2 (Data Link Layer), Layer 3 (Network Layer) and Layer 4 (Transport Layer). Optionally, the switching means is also adapted for Layer 5 switching. As an intelligent multi-layer switch, the switching core supports features such as VLAN Tagging, Layer 2/3 table lookup, ingress filtering, NAT/PAT and egress scheduling as described below. A known multi-layer switching core is described, for example, in U.S. Pat. No. 6,335,935 the content of which is incorporated by reference.

VLAN Tagging

When a packet of a VoIP-phone arrives at a port ingress, the packet is assumed to be untagged and a VLAN ID (VLAN identification) tag (for example, a VLAN tag according to IEEE standard 802.1q) will be inserted into the packet based on the MAC address of the of the source phone device. The VLAN ID in this tag identifies the packet as a voice packet. On the other hand, packets from PCs may arrive at the intelligent switch tagged or untagged. If it is untagged, it will be tagged with a VLAN ID associated with the source port. When a packet is tagged, the DA (destination address) of the packet and the VLAN tag are used to determine the egress port(s). If DA equals the MAC address of the VDS, it will be processed in Layer 3, otherwise, it will be processed in Layer 2.

Layer 2 Table Lookup

Firstly, the VLAN ID of a packet will be determined. A Layer 2 switching table lookup will be performed to look for a match of the destination phones so as to identify the egress port. The key of the lookup comprises 2 elements, namely, the MAC address and the VLAN ID, i.e. {MAC address, VLAN ID}. A failure, which is commonly termed "destination lookup failure" (DLF), will mean that the destination MAC address accompanying the packet is not known by the switch. Consequently, the packet will be forwarded to all the ports in the VLAN associated with the packet (unknown unicast), making each one of these ports a potential egress port. However, at this stage the lookup table only generates a list of possible egress ports and the packet is not yet switched out.

Layer 3 Table Lookup

If Layer 3 processing is enabled, a Layer 3 table lookup will be performed instead. This happens when the destination address (DA) matches the MAC address of the intelligent switch. This Layer 3 switching technique is a standard mechanism for crossing VLAN boundaries. Based on the destination IP address of the packet, a match in the Layer 3 lookup table will point to an egress port, a next hop MAC address, a router MAC address and a VLAN ID. The next hop MAC address will replace the DA field in the packet, the router MAC address will replace the source address (SA) field. On the other hand, a lookup failure would normally be handled by a default routing table, based on the destination IP subnet.

In the Layer 2 or Layer 3 table lookup process, if the packet is addressed to the CPU of the intelligent switch, the CPU would be included in the list of potential egress ports. Thus, on a switching prospective, the CPU is treated as one of the ports of the switch. In the case of the intelligent switch described below, which carries 48 FE ports and 4 GE ports, port 53 is reserved for the CPU.

Packet Filtering

Packet filtering is an additional process to control packet switching based on information other than the normal Layer 2 or Layer 3 addresses. In this mechanism, packets are matched on the basis of their L2 or L3 source/destination addresses, protocol ID, TCP/UCP port numbers, or similar control protocols. In this process, results of Layer 2 or Layer 3 table lookups may be overridden, a packet may be discarded, redirected to another port or forwarded to the CPU, as explained below. Hence, the resulting egress port list after Layer 2 or Layer 3 table lookups can be changed to one or more ports by a matching packet filter. This packet filtering process is called flow classification, since a packet is classified into a particular flow after it has been filtered. The exemplary intelligent switch supports 16 k flows. Packets are scheduled to exit the switch according to the classes of service (COS) associated with their flows.

In packet filtering, it is essential to resolve conflicts when a packet matches conflicting rules, which point to contradictory or conflicting actions (for example, the action according to a matching rule is to switch the packet with a higher priority, while the other action is to drop the packet). Typical packet filtering schemes have a pre-defined tie-breaker in case a packet matches multiple rules. They can be determined by an explicit priority assigned to the filtering rule, the index of the filtering masks (a table indicating which fields in the packet to filter), the index of the filtering rules (a table indicating the values of the fields of interest in order to produce a filtering match), etc. The actual conflict resolution, or tie-breaking, scheme is not important, since this invention is applicable to a switching core of any conflict resolution scheme.

NAT/PAT

Network Address Translation (NAT) and Port Address Translation (PAT) are optional steps after the ingress filtering process. They are required in case the intelligent switch is an intermediate transit point of a packet. The originating station sends the packet with the switch. With knowledge of the packet origin and destination, the switch transforms the destination address of the packet from itself to its real destination. This feature is useful for switches that serves as firewall, tunneling originating-point, etc. NAT/PAT can be an action after an ingress filtering packet match, much like the packet-dropping action or CPU-forwarding action, which thus makes it part of ingress filtering. It can also be a separate step after the ingress processing. This invention is transparent to both types of NAT/PAT.

Egress Scheduling

The intelligent switch further comprises an egress scheduler. At the port egress of the intelligent switch, the egress scheduler will decide how a packet will exit. The exit order of a packet is based on the flow queue to which the packet belongs. A mapping of {Flow Queue, port, class, sub-class} is maintained at the egress for scheduling. For each port, a weighted round robin (WRR) is performed to determine the class of packets to exit. With two levels of classes, a total of 64 (8×8) COS can be supported by the egress scheduler of the exemplary intelligent switch in the VDS to be described below.

An Exemplary Packet Ingress Process

Figure 7:
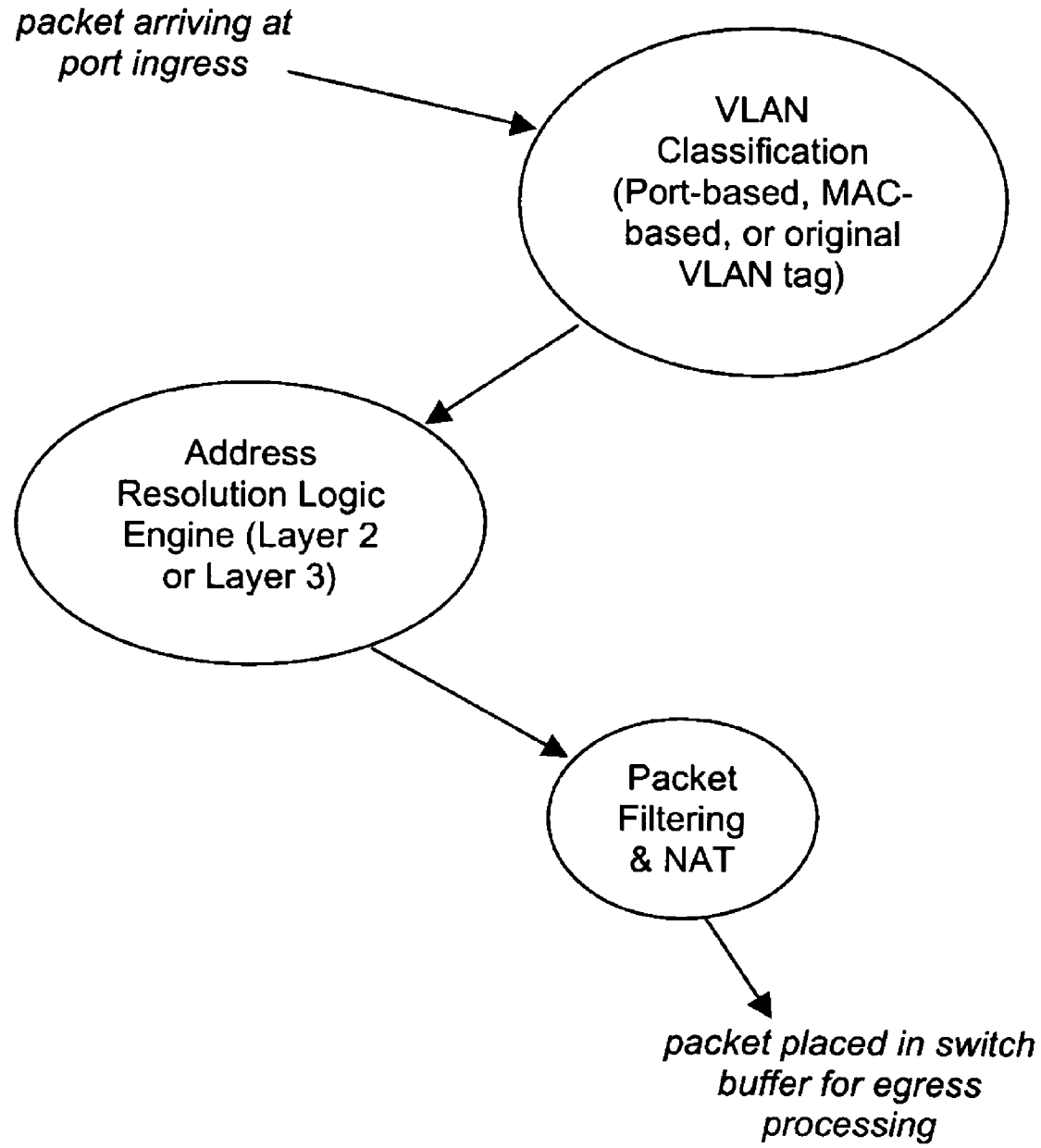
FIG. 7 is a data flow diagram illustrating an exemplary ingress filtering for an exemplary application.

A typical scheme of ingress packet processing at the ingress of the intelligent switch is illustrated in FIG. 7. In this process, a packet arriving at the ingress is first tagged with a virtual LAN (VLAN) tag (if it is untagged). The tagging is based on either the packet's source MAC address or its ingress port. If the incoming packet is already tagged, the VLAN ID table will be looked up to retrieve the relevant packet processing parameters. After this, it will be processed according to its Layer 2 (Ethernet packet) or Layer 3 (IP) header, whereby one or more egress port candidates are determined. Before the packet actually progresses to the egress of the intelligent switch, it will pass through the ingress filter to ascertain whether the packet meets certain prescribed conditions which will point to the change of forwarding behavior.

Processing of packets at the ingress of the intelligent switch, especially by the use of hardware-based switches, would help to ensure that the voice packets which are being switched in a session are genuine, and not from an impersonator or man-in-the-middle. The integrity of a session is preserved since it cannot be directed to a 3rd party for eavesdropping. Security and reliability are achieved by setting up hardware-based ingress filters to control the LAN switching of all the voice sessions of IP phone calls. In particular, only VoIP call control traffic, network control traffic and media traffic from established sessions are allowed in the voice network.

In addition, since unknown unicast is prohibited in the switch, such traffic will not be able to flood all the physical ports in when a Destination Lookup Failure (DLF) occurs in Layer 2 switching. The session-based multi-layer switching will resolve such a problem. Network control traffic like ARP broadcast will be handled by software (for example, an ARP relay agent) implemented in the intelligent switch. To implement an intelligent switch which will accomplish all or some of the above security strategy, ingress processing means and egress scheduling means are provided in the intelligent switch.

Mandatory Transit of Calls through the Intelligent Switch

Figure 5:
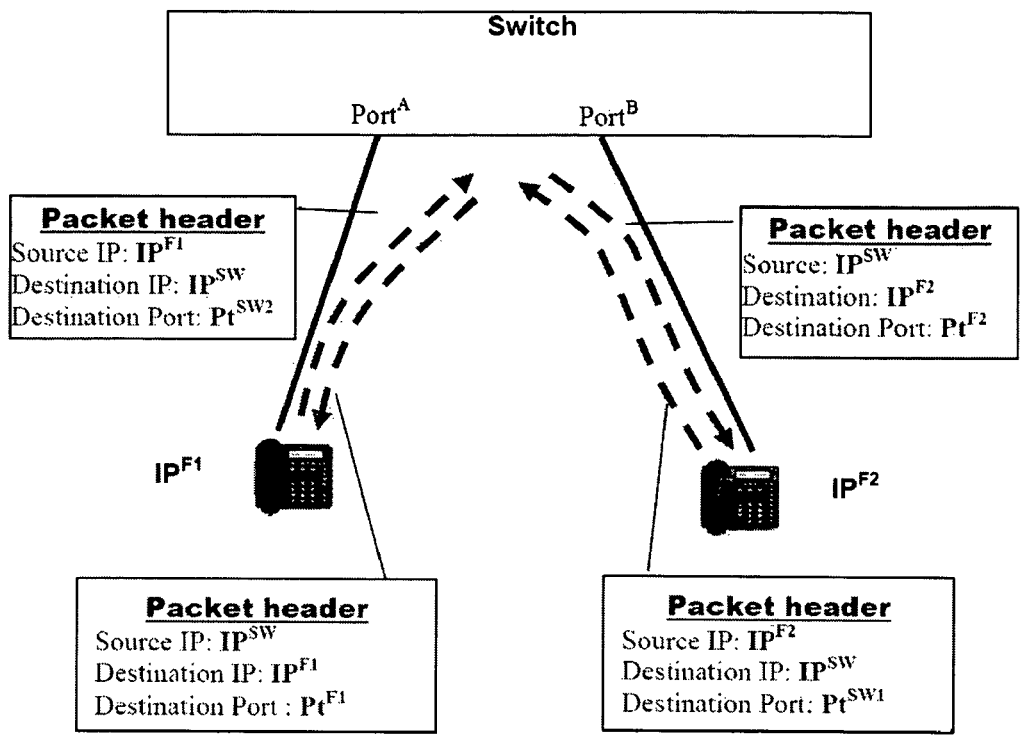
FIG. 5 illustrates exemplary call legs of a VoIP call session in a network of FIG. 4 and implemented according to this invention.
Figure 6:
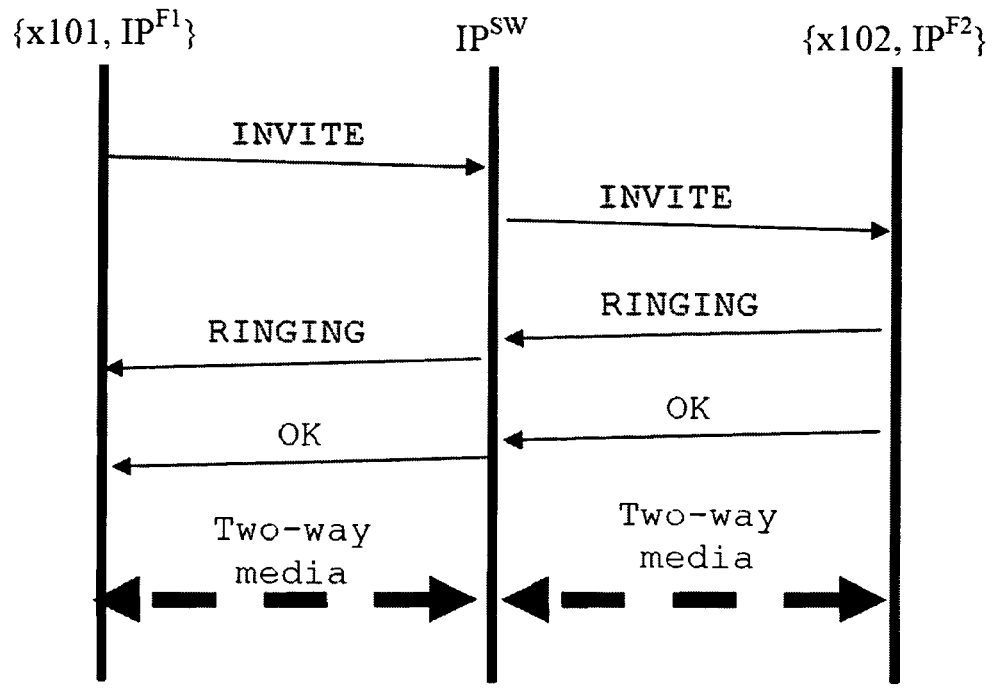
FIG. 6 illustrates a sequence of call setup messages using the intelligent switch in the exemplary network of FIG. 9.

To ensure that every call session in the voice network will pass through the intelligent switch, every voice call session in this exemplary network is partitioned into two call legs with the intelligent switch in the middle and connecting the two call legs. FIG. 5 shows two IP phone devices F1 and F2 which are connected to the voice sub-network of FIG. 4. The intelligent switch $IP^{SW}$ is connected between the phone devices F1 and F2. When a voice call is to occur between F1 and F2, a call setup message exchange in accordance with SIP will occur between device F1 (phone extension 101), device F2 (phone extension 102) and the intermediary intelligent switch $IP^{SW}$ as illustrated in FIG. 6. Firstly, IP phone device F1 will initiate the call signaling sequence by sending an INVITE request to the intelligent switch. Upon satisfying that the INVITE request from F1 is legitimate, the intelligent switch will send an INVITE request to phone device F2. Thereafter, phone device F2 will return a RINGING response to phone device F1 via the intelligent switch. When phone device F2 is answered, phone device F2 will send an OK message to phone device F1 via the intelligent switch and two-way media traffic between F1 and F2 via the intelligent switch will begin. The protocols INVITE, RINGING and OK above are standard SIP messages.

It will be noted that the intelligent switch ($IP^{SW}$) is the endpoint of the first call leg of every voice call in the voice sub-network. As can be seen from the accompanying packet header narration boxes of FIG. 5, the packet headers of a call is transformed when a call transits through the intelligent switch ($IP^{SW}$). Notably, the packet header of the first leg of a call and the packet header of the second leg of that call are different. Specifically, the intelligent switch ($IP^{SW}$) transforms the packet header when a call transits through it for reasons to be explained below.

Referring to the exemplary calls of FIG. 5, an exemplary first call is originated from the source IP phone device with IP address $IP^{F1}$ to the destination device with IP address $IP^{F2}$. The packet header in the first leg of this call comprises the following.

| Packet Header, call 1, $1^{st}$ leg | |
|---|---|
| Source | $IP^{F1}$ |
| Destination IP | $IP^{SW}$ |
| Destination Port | $Pt^{SW2}$ |

Upon transit through the intelligent switch, the packet header is transformed as follows.

| Packet Headers, call 1, $2^{nd}$ leg | |
|---|---|
| Source | $IP^{SW}$ |
| Destination IP | $IP^{F2}$ |
| Destination Port | $Pt^{F2}$ |

Similarly, for the exemplary second call originating from the source IP phone device with the IP address $IP^{F2}$ to the destination IP phone device with the IP phone address $IP^{F1}$, the packet header in the first leg is as follows.

| Packet Headers, call 2, $1^{st}$ leg | |
|---|---|
| Source | $IP^{F2}$ |
| Destination IP | $IP^{SW}$ |
| Destination Port | $Pt^{SW1}$ |

Upon transit through the intelligent switch, the packet header is transformed as follows.

| Packet Headers, call 2, $2^{nd}$ leg | |
|---|---|
| Source | $IP^{SW}$ |
| Destination IP | $IP^{F1}$ |
| Destination Port | $Pt^{F1}$ |

Means to accomplish mandatory transit of calls through the intelligent switch will be explained below.

Ingress Processing

To accomplish the various security strategy above, the intelligent switch is characterized by ingress processing means which are adapted to process incoming packets before legitimate packets are released into the voice network. Ingress processing of incoming packets will be explained below with reference to an unicast traffic. In particular, the ingress processing means comprises network/port address translation means, ingress filtering means and VLAN tagging means.

Network Address Translation (NAT) and/or Port Address Translation (PAT)

When an IP phone attempts to make a call to another IP phone in the voice network, a call setup message exchange will be processed by the intelligent switch. This call setup message and the subsequent media session will be split into two call legs, as illustrated in FIG. 5. Through this process, the intelligent switch will have acquired knowledge of the Layer 4 port (L4P) for both legs of the media streams. To further ensure that subsequent traffic between the phone devices will transit through the intelligent switch so that data traffic in the voice network will not go unsupervised, a network address translation (NAT) and/or port address translation (PAT) will be performed by the intelligent switch.

After undergoing these address translation processes (NAT/PAT), the intelligent switch will become a mandatory intermediary device between the respective devices and all subsequent traffic of the same session will necessarily pass through the intelligent switch before reaching the destination device. To cater for such address translations, means for performing NAT/PAT are incorporated into the intelligent switch.

Referring to the exemplary call 1 of FIG. 5 as a convenient example, when incoming packets of call 1 (first leg) from the phone device $IP^{F1}$ head towards the phone device $IP^{F2}$, the accompanying packet header with source $IP=IP^{F1}$, destination $IP=IP^{SW}$ and destination port=$Pt^{SW2}$ will be received at the physical port $Port^A$. Before the packets are exported to the phone device $IP^{F2}$ via $Port^B$, the NAT/PAT transformation means in the intelligent switch will transform the packet header accompanying the data packets so that the addresses in the packet header will become source $IP=IP^{SW}$, destination $IP=IP^{F2}$ and destination port=$Pt^{F2}$.

Likewise, when incoming packets of call 2 (first leg) from the phone device $IP^{F2}$ head towards the phone device $IP^{F1}$, the accompanying packet header with source $IP=IP^{F2}$, destination $IP=IP^{SW}$ and destination port=$Pt^{SW1}$ will be received at the physical port $Port^B$. Before the packets are exported to the phone device $IP^{F1}$ via $Port^A$, the NAT/PAT transformation means in the intelligent switch will transform the packet header accompanying the data packets so that the addresses in the packet header will become source $IP=IP^{SW}$, destination $IP=IP^{F1}$ and destination port=$Pt^{F1}$.

It will be apparent from the above examples that the address of the intelligent switch has become the address of the source and destination in both cases. This NAT/PAT process is usually the last step of ingress processing.

As a general rule, for packets coming into physical port $Port^A$, if the source IP, destination IP and destination port respectively match the first call leg of $IP^{F1}$, $IP^{SW}$, and $Pt^{SW2}$, the packet will be switched out of $Port^B$, while the source IP, destination IP and destination port are respectively transformed to $IP^{SW}$, $IP^{F2}$, and $Pt^{F2}$.

For packets coming into physical port $Port^B$, if the source IP, destination IP and destination port respectively match the first call leg of $IP^{F2}$, $IP^{SW}$, and $Pt^{SW1}$ respectively, the packet will be switched out at $Port^A$, while the source IP, destination IP and destination port are respectively transformed to $IP^{SW}$, $IP^{F1}$, and $Pt^{F1}$.

Since no traffic will be allowed to be switched to a phone except the network control traffic and VoIP call control traffic to ensure network security and reliability, the above general rules facilitate secure switching of voice traffic to the phones to make the IP phone service operational.

In addition, bandwidth management is applied so that a pre-determined bandwidth is reserved for switching of voice packets. For voice traffic flows defined in the above general rules, since voice compression bit-rate is normally known, a pre-determined bandwidth can be reserved.

Therefore, only VoIP call control traffic, network control traffic and media traffic from established sessions are allowed in the voice network.

Ingress Filtering

The ingress filtering means examine incoming packets and operate to determine whether to allow incoming packets into the voice network. The following are exemplary ingress filtering rules to be implemented in the intelligent switch.

Rule 1: all packets to enter an IP phone subnet ($IP^{F1}$, $IP^{F2}$, $IP^{F3}$ & $IP^{F4}$), or packets to be transmitted within the same subnet between phones, have to transit through the intelligent switch and the ingress filtering means. Packets will be dropped unless they are recognized voice packets or recognized voice traffic control packets from an authenticated device and/or registered device. A recognized packet means a packet in accordance with an appropriate protocol, such as SIP or the like. For example, packets containing network traffic control data, such as, for example, DHCP response, ARP response and the like, must be allowed to be switched to the phones. Such network control data should be configured into the corresponding filter tables. A direct consequence of Rule 1 is that no data traffic, except network control traffic and VoIP call control traffic, is allowed to be switched to a phone to ensure network security and reliability.

Rule 2: call control packets are rate-policed. For example, genuine SIP voice data packets do not normally exceed a few hundred-kilobytes-per-second. Data, even if SIP data, exceeding a reasonable threshold data rate for a genuine voice traffic are likely to be of a malicious nature and will be blocked. As a convenient example, the incoming traffic data rate may be limited at a threshold arte of below 1 MB/s. Any SIP traffic (legitimate or not) above this threshold rate must be dropped.

Rule 3: call control packets originated from ITS to the IP phones are allowed, subject to rate-policing similar to rule 2 above.

Since all data packets, including traffic control data packet and media traffic data packet, must go through the intelligent switch as a middle agent, when the data packets are transported within the voice network or attempting to enter the voice network. No data packets can bypass the ingress filtering means nor entering or traveling within the voice network without the permission of the intelligent switch. Hence, direct phone-to-phone communication mode which is prevalent in conventional VoIP environment is prohibited.

It will be noted that a packet may match both Rules 1 and 3. If this happens, a conflict resolution scheme will be required to resolve conflict (e.g. DROP action in Rule 1 and SWITCH action in Rule 3). For example, a rule of higher number will prevail over a rule of lower number. A predefined conflict resolution scheme is necessary if a packet matches multiple ingress filtering rules.

Egress Scheduling

The intelligent switch further comprises an egress scheduler. At the port egress of the intelligent switch, the egress scheduler will decide how a packet will exit. The exit order of a packet is based on the flow queue to which the packet belongs. A mapping of {Flow Queue, port, class, sub-class} is maintained at the egress for scheduling. For each port, a weighted round robin (WRR) is performed to determine the class of packets to exit. With two levels of classes, a total of 64 (8×8) COS can be supported by the egress scheduler of the exemplary intelligent switch in the VDS to be described below.

An Exemplary Voice and Data Switch

Figure 8:
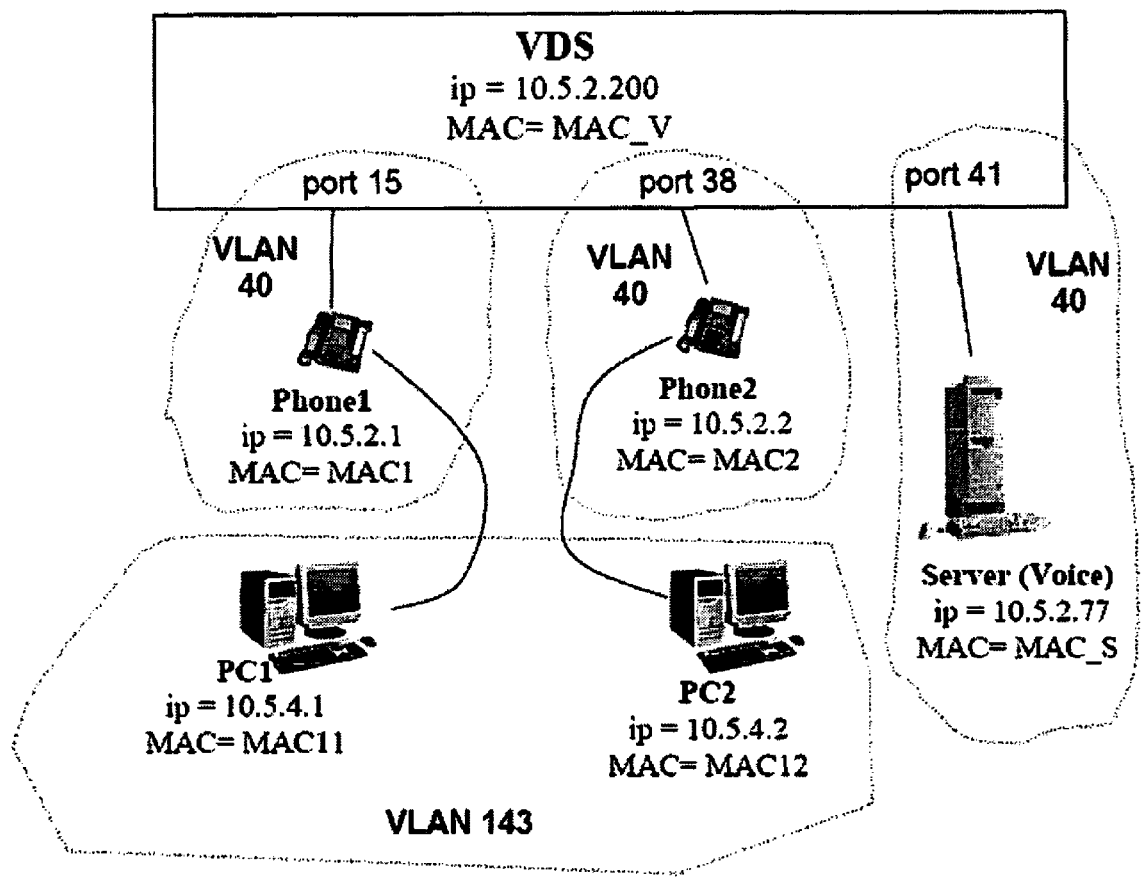
FIG. 8 is a second exemplary network configuration utilizing a voice data switch (VDS) which incorporates an intelligent switch of this invention.
Figure 9:
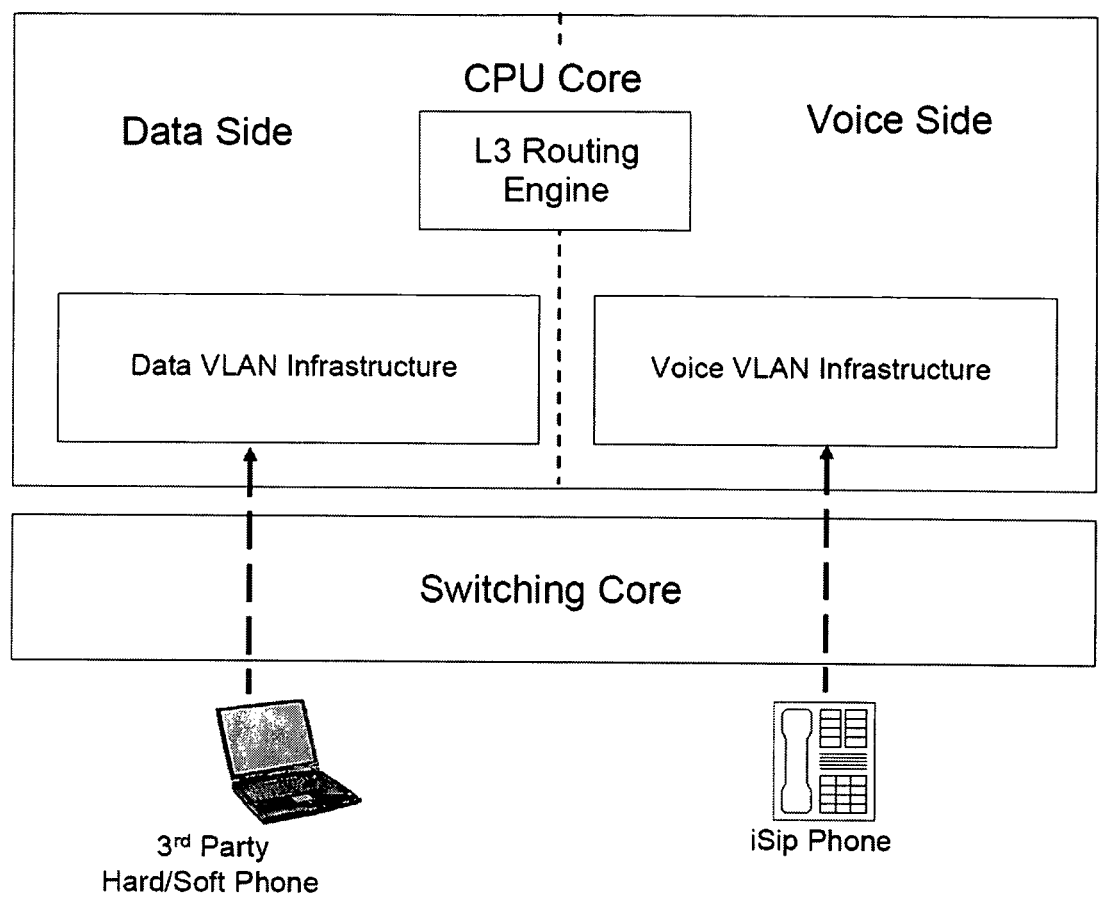
FIG. 9 is a block diagram showing high-level system architecture of an exemplary voice data switch (VDS) incorporating a preferred embodiment of an intelligent switch this invention.

An exemplary voice and data switch (VDS) incorporating an intelligent switch of this invention is illustrated in FIGS. 8-9. This VDS serves three major networking and communication functions in an enterprise environment, namely, data networking, telecommunications and network security. Specifically, this VDS combines the functions of data switching, VoIP and security and is scalable to suit the requirements of small, medium and large enterprises.

Configuration of the Intelligent Switch

Besides Layer 2 and Layer 3 lookup tables and standard components for standard packet processing, additional components namely, a) VLANMemberMap Table, b) SW_FLOW_FILTER Table, c) SW_FLOW_TRANSLATE Table, d) VoiceMAC Table, e) VoiceVID Table are utilized for enforcing security strategies are described below.

a) VLANMemberMap Table

The VLANMemberMap Table carries the port bitmap for each VLAN so that legitimate devices can be recognized.

b) SW_FLOW_FILTER Table

The packet filtering means are primarily responsible for enforcing voice network security strategies. Entries in this SW_FLOW_FILTER table are to be used by the filtering rules which drive the filtering means or filtering engine. Each incoming packet is filtered according to a predetermined set of filtering rules. Specifically, the header of each packet is matched against rules set up in SW_FLOW_FILTER. If a match is produced, a pre-determined action such as packet discard or packet re-direction will occur.

In the SW_FLOW_FILTER Table, the numerical order of the filters will determine the priority of the filters and packets are filtered through the filters in a linear order. Since a first filtering match will stop the matching process, a higher priority filter should be placed ahead of a lower priority filter. For example, although there may be a blanket denial policy for all traffic destined to the voice network, a higher priority policy that a voice traffic is to allowed between two phones will take priority if an explicit SIP session is already set up. This policy can be implemented by placing the higher priority filter at a lower index while the lower priority filter at a higher index.

c) SW_FLOW_TRANSLATE Table

Entries in this table constitute the NAT/PAT rules that determine which and how the packets are modified.

e) VoiceMAC Table

The VoiceMAC Table, indexed by port number, carries the authenticated MAC address of the voice client connected to that port. Only traffic from that MAC address will be admitted into the Voice VLAN.

f) VoiceVID Table

The VoiceVID Table, indexed by port number, carries the VLAN ID of a Voice VLAN.

Exemplary Application of the VDS

Referring to the network configuration of FIG. 8 in which the VDS segregates the data and voice network. In this configuration, 1) only known unicast between ports are allowed, 2) multicast, unknown unicast and broadcast are prohibited, and 3) traffic cannot cross over the VLAN boundary into other VLANs and vice versa.

When a phone call between phone devices is to be made, call signaling exchange among the phone devices and the VDS will establish two RTP sessions between the phone devices with the transmission of voice packets. As is described above, each RTP session is partitioned into two legs, with the VDS as a mandatory mid-point.

In the exemplary call between Phone1 and Phone2 in the example of FIG. 8, the RTP session from Phone1 (10.5.2.1) to Phone2 (10.5.2.2) is partitioned into 2 legs, with VDS (10.5.2.200) as the mid-point. The following exemplary UDP ports are used as an example in these two legs for convenient illustrations.

| | Src IP | Dest IP | Dest Port |
|---|---|---|---|
| Leg 1 | 10.5.2.1 | 10.5.2.200 | 57280 |
| Leg 2 | 10.5.2.200 | 10.5.2.2 | 57336 |

Likewise, the RTP session from Phone2 to Phone1 is partitioned into two legs with the corresponding UDP ports below.

| | Src IP | Dest IP | Dest Port |
|---|---|---|---|
| Leg 1 | 10.5.2.2 | 10.5.2.200 | 52420 |
| Leg 2 | 10.5.2.200 | 10.5.2.1 | 50020 |

The relevant specific hardware configurations to support voice security strategy are further described below.

Exemplary VLANMEMBERMAP Table

For a port-based VLAN, all FE ports but port 41 are assigned to a default VLAN of 143 for data traffic. If a packet which is not originated from an SIP phone arrives at the port ingress untagged, it will be tagged with VLAN ID=143 since VLAN 40 is used as the voice VLAN.

| VLAN ID | Member Port Map | X2 |
|---|---|---|
| 40 | 1, 2, 3, 4, . . . 48 | 1 |
| 143 | 1, 2, 3, 4, . . . 40, 42, . . . 48 | 0 |

Exemplary SW Flow Filtertable 1

The following table shows exemplary filtering rules in the SW_FLOW_FILTER to enable secured voice networking. The underlined fields are the fields used to match the packet.

| | Ingress Port | Src IP | Dest IP | Dest Port | Action | Egress Port | BW Limit | Output Flow ID |
|---|---|---|---|---|---|---|---|---|
| Filter 1 | 15 | 10.5.2.1 | 10.5.2.200 | 57280 | redirect | 38 | N1 Kb/s | F1 |
| Filter 2 | 38 | 10.5.2.2 | 10.5.2.200 | 52420 | redirect | 15 | N1 Kb/s | F2 |

In the above table, filters 1 and 2 are dynamic filters which are created only for the duration of the call. All other filters are permanent or static filters which are created in the filter table during system initialization, after the VDS and server farm have acquired their respective IP addresses. As can be seen in the table, all the traffic is bandwidth policed at the switch ingress. The maximum allowable bandwidth or bandwidth threshold is customised according to a predetermined acceptable level of traffic capacity as listed below.

N1 Kb/s—permitted capacity to phone, an exemplary value of N1 is 100 kbps,

N2 Kb/s—permitted capacity to voice server farm, an exemplary value of N2 is 10 kbps, N3 Kb/s—permitted voice traffic capacity to VDS CPU, an exemplary value of N3 is 10 kbps, N4 Kb/s—permitted data traffic capacity to VDS CPU, an exemplary value of N4 is 10 kbps.

The operation of the relevant filters of this specific example will be explained below.

1. All RTP packets (SrcIP=10.5.2.1, DestIP=10.5.2.200, DestPort=57280) are switched. These packets will be redirected to port 38 alone. This traffic flow cannot exceed a certain capacity (N1 Kb/s); such that any hacking PC impersonating the phone cannot overload the other phone. After ingress processing, the packet will be put into the flow queue (F1) for this particular voice session.
2. All RTP packets (SrcIP=10.5.2.2, DestIP=10.5.2.200, DestPort=52420) are switched. These packets will be redirected to port 15 alone. This traffic flow cannot exceed a certain capacity (N1 Kb/s) either. After ingress processing, the packet will be put into the flow queue (F2) for this particular voice session.

Exemplary SW Flow Translatetable

The SW_FLOW_TRANSLATE table below illustrates an exemplary packet NAT process. NAT processes are performed on the first leg (Phone1 to VDS) and the second leg (VDS to Phone2) of the voice packet. A similar NAT operation is performed on the RTP session in the reversed direction. Detailed entries on the two legs of the two exemplary calls are set out in an example below. In the example below, ports 57280, 57336, 52420 and 50020 are assumed as the only sample ports negotiated by the serve and the clients during call setup.

destination IP=10.5.2.200, and destination UDP port=52420.

Similarly, the last parameter identifies the packet as an RTP packet in this voice session from Phone2 to Phone1. When recognized, the following fields in the packet will be translated.

Phone1 as the destination, with DA being changed to MAC1 and destination IP to 10.5.2.1;

VDS as the source, with SA being changed to MAC_V and source IP to 10.5.2.200;

destination port being changed to 50020, which is the UDP port Phone1 is listening to for voice packets;

Exemplary VoiceMAC TABLE

A VoiceMAC table is used to store legitimate MAC addresses of authenticated voice devices (SIP phones). Only such authenticated devices will be admitted into the voice network (VLAN 40).

| Index (Port Number) | MAC Address |
|---|---|
| 15 | MAC1 (phone 1) |
| 38 | MAC2 (phone 2) |
| 41 | MAC_S (server) |

Exemplary VOICEVID Table

The exemplary VoiceVID table below shows the VLAN ID for the Voice VLAN associated with each port. In this example, a single VLAN is used for all authenticated SIP phone devices.

|  | Ingress Port | Src IP | Dest IP | Dest Port | New DA | New SA | New Src IP | New Dest IP | New Dest Port |
|---|---|---|---|---|---|---|---|---|---|
| NAT Entry 1 | 15 | 10.5.2.1 | 10.5.2.200 | 57280 | MAC2 | MAC_V | 10.5.2.200 | 10.5.2.2 | 57336 |
| NAT Entry 2 | 38 | 10.5.2.2 | 10.5.2.200 | 52420 | MAC1 | MAC_V | 10.5.2.200 | 10.5.2.1 | 50020 |

It will be appreciated that the entries in the SW_FLOW_TRANSLATE table are dynamic entries and are good only for the duration of the call. The entries are further elaborated below.

1. Packets from Phone1 to VDS are recognized based on
   ingress port=15,
   source IP=10.5.2.1,
   destination IP=10.5.2.200, and
   destination UDP port=57280.

The last parameter identifies the packet as an RTP packet of a voice session from Phone1 to Phone2. When the RTP packet is recognized, the following fields in the packet will be translated.

Phone2 as the destination, with DA being changed to MAC2 and destination IP to 10.5.2.2;

VDS as the source, with SA changed to MAC_V and source IP changed to 10.5.2.200;

destination port iss changed to 57336, which is the UDP port Phone2 is listening to for voice packets;

2. Packets from Phone2 to VDS are recognized based on
   ingress port=38,
   source IP=10.5.2.2,

| Index (Port Number) | VLAN ID |
|---|---|
| 15 | 40 |
| 38 | 40 |
| 41 | 40 |

Exemplary Layer2 Table

The entries in the Layer 2 forwarding table is not preset by the network administrator. Instead, the entries are learned and updated automatically during ingress processing when a packet of a specific MAC address and VLAN ID arrives at the intelligent switch for the first time. The following table shows the Layer 2 entries with the fields of relevance after learning and updating.

| MAC | VLAN ID | Egress Port ID |
|---|---|---|
| MAC1 | 40 | 15 |
| MAC2 | 40 | 38 |
| MAC11 | 143 | 15 |

-continued

| MAC | VLAN ID | Egress Port ID |
|---|---|---|
| MAC12 | 143 | 38 |
| MAC_S | 40 | 41 |

Exemplary Layer 3 Table

There are many ways to configure a Layer 3 forwarding table. It can be configured automatically and updated periodically by standard routing protocols like RIP or OSPF. It can also be configured statically. The fields of particular relevance in this table include:
- the Next Hop MAC address, which will become the new DA for the routed packet;
- the router MAC address, which will become the new SA for the routed packet;
- the new VLAN ID; and
- the egress port ID.

Assuming the routes are configured statically, the Layer 3 table will have the following entries:

| IP Address | Next Hop MAC | Router MAC | Egress Port ID | VLAN ID |
|---|---|---|---|---|
| 10.5.2.1 | MAC1 | MAC_V | 15 | 40 |
| 10.5.2.2 | MAC2 | MAC_V | 38 | 40 |
| 10.5.2.77 | MAC_S | MAC_V | 41 | 40 |
| 10.5.2.200 | — | — | 53 | — |
| 10.5.4.1 | MAC11 | MAC_V | 15 | 143 |
| 10.5.4.2 | MAC12 | MAC_V | 38 | 143 |

In the Layer 3 routing table above, the router itself also warrants an entry. It simply indicates that the packet should be routed to port 53, the CPU.

Intrusion Defense

With the implementation of the security policies mentioned above, system security and reliability is greatly enhanced. The following examples will illustrate how the intrusion defence mechanism of the VDS can operate to uphold system reliability.

1. Data Packets Impersonating as Voice Packets

As mentioned above, data packets are prohibited in the voice VLAN. Therefore, untagged packets arriving at the switch will not be tagged with a voice VLAN tag. To attempt unauthorised entry, a malicious PC may tag data packets with a voice VLAN tag to impersonate voice packets. For example, a PC may impersonate the MAC and IP address of the SIP phone to which it is attached. The PC may attempt to replace the SIP phone and then transmit Voice VLAN broadcast/unknown unicast. As broadcast and unknown unicast are prohibited in this special Voice VLAN, this attempt will fail. Known unicast packets will also fail because the PC does not have a secured connection to the switch, which is established only after a pre-defined authentication procedure.

2. Data Packet Tagged with a Bogus Voice VLAN ID

A PC may generate packets tagged with a voice VLAN ID while using its own MAC address. For example, the PC with the IP address of 10.5.4.1 is connected to an authenticated SIP phone which is connected to the voice network with VLAN ID=40, when the PC sends a packet which is tagged with VLAN ID 40 to the VDS, the packet will be stopped before reaching the egress port. This is because the VLAN classification component in the port ingress will check whether the SA of the packet matches the SA of the authenticated SIP phone at that port. Since it does not match, the VLAN classification component will drop the packet for attempted impersonation. This happens regardless whether the packet is a broadcast/unknown unicast or a known unicast. Therefore a packet with a bogus VLAN ID tag will not be admitted to the voice VLAN.

While this invention has been explained by reference to the examples or preferred embodiments described above, it will be appreciated that those are only examples to assist understanding of the present invention and shall not be construed as restrictive to the scope of invention. In particular, variations or modifications which are obvious or trivial to persons skilled in the art, as well as improvements made thereon, should be considered as an equivalent version of this invention.

Furthermore, while the present invention has been explained by reference to a VoIP system using SIP, it should be appreciated that the invention can apply, whether with or without modification, to other voice-over-packet communication systems without loss of generality.

The invention claimed is:

1. A switching apparatus for selectably switching packetized traffic between a first and a second authenticated communication device connected to the switching apparatus via communication ports of the switching apparatus, said packetized traffic including call control packet traffic processable for establishing a voice-related call session between the first and second authenticated communication devices and medium packet traffic indicative of digitized voice data, the switching apparatus comprising:
   a multi-layer switch that performs:
   (a) rate policing call control packet traffic received from the first authenticated communication device, wherein a call session is established between the first and second authenticated communication devices through the multi-layer switch based on the call control packet traffic in response to the multi-layer switch determining that a data rate of the call control packet traffic is below a prescribed data rate threshold; and
   (b) splitting medium packet traffic communicated from the first authenticated communication device towards the second authenticated communication device via the multi-layer switch during an established call session between the first and second authenticated communication devices, into a first call segment and a second call segment wherein, said splitting of medium packet traffic includes the multi-layer switch performing at least Layer-3 processing of said medium packet traffic such that the first call segment is configured to originate from said first authenticated communication device and terminate at said multi-layer switch, and the second call segment is configured to originate from said multi-layer switch and terminate at said second authenticated communication device;
   wherein packetized traffic received by the multi-layer switch during the established call session between the authenticated first and second communication devices is processed by an ingress filter of the multi-layer switch based on at least one switching rule that allows only voice-related call control packet traffic and medium packet traffic received from at least one of the first and second authenticated communication devices, the packetized traffic is processed to be onwardly switched between the first and second authenticated communication devices via the multi-layer switch while restricting non-voice related packetized traffic from being communicated between the first and second authenticated communication devices via the multi-layer switch, and said at least one switching rule allowed automatic activation in response to establishment of the call session and automatic deactivation in response to termination of the call session.

2. The switching apparatus according to claim 1, wherein the multi-layer switch is adapted to divide a call connection from the second authenticated communication device to the first authenticated communication device into a first call segment and a second call segment based on to at least Layer-3 processing of medium packets received by the multi-layer switch, the first and second authenticated communication devices are respectively connected to a first communication port and a second communication port, the first call segment contains an address identification of the second authenticated communication device as source, address identification of the switching apparatus as destination and port identification of the switching apparatus as an intermediate listening port, the second call segment contains address identification of the switching apparatus as source, address information of the first authenticated communication device as destination, and port identification of the first authenticated communication device as a destination listening port.

3. The switching apparatus according to claim 2, wherein said address identification is an IP-address.

4. The switching apparatus according to claim 3, wherein said port identification is a Layer-4 port number.

5. The switching apparatus according to claim 1, wherein a call connection between the first authenticated communication device and the second authenticated communication device is established by passage of call control packets between said first authenticated communication device and a processing means and between said processing means and said second communication device to establish a call session.

6. The switching apparatus according to claim 5, wherein said switching apparatus precludes communication between the first and second authenticated communication devices unless a call session has been established.

7. The switching apparatus according to claim 6, wherein said processing means comprises a server co-located with said switching apparatus.

8. The switching apparatus according to claim 7, wherein said server comprises a Session Initiation Protocol server.

9. The switching apparatus according to claim 8, wherein medium packets are switched between the first and second authenticated communication devices based on Internet Protocol addresses and ports established for said call session.

10. The switching apparatus according to claim 9, wherein medium packets are network address translated by the multi-layer switch via at least Layer-3 processing to switch to a destination device.

11. The switching apparatus according to claim 1, wherein the prescribed data rate threshold to a telephone device is 100 kbps.

12. The switching apparatus according to claim 1, wherein said ingress filter comprises device authentication means for ascertaining the identities of one of more communication devices from which each incoming data packets of a voice traffic are admitted by said switching apparatus for onward transmission to another communication device.

13. The switching apparatus according to claim 1, wherein said device authentication means comprises means for ascertaining the Media Access Control address of an originating communication device, only packets from a device with an authenticated Media Access Control address are admitted into the network.

14. The switching apparatus according to claim 1, wherein said ingress filter comprises means for policing bandwidth of data packets and means to block data packets exceeding a predetermined threshold data bandwidth which is indicative of non-voice traffic.

15. The switching apparatus according to claim 1, wherein voice traffic is based on Session Initiation Protocol.

16. The switching apparatus according to claim 1, wherein in a voice Virtual Local Area Network formed by at least said switching apparatus and said first and second authenticated communication devices, said switching apparatus precludes broadcast and multi-cast by any one of the first and second authenticated communication devices.

17. The switching apparatus according to claim 1, wherein in a voice Virtual Local Area Network formed by at least said multi-layer switch and said first and second authenticated communication devices, said multi-layer switch precludes unknown unicast.

18. The communication network comprising segregated voice and data networks and a switching apparatus of claim 1, wherein all data packets transiting from said data network to said voice network pass through said multi-layer switch.

19. The communication network according to claim 18, wherein a plurality of Internet Protocol phone devices are connected to said switching apparatus for Voice over Internet Protocol applications.

20. A method of selectably switching packetized traffic from a first authenticated communication device to a second authenticated communication device via an intermediate multi-layer switching apparatus, said packetized traffic including call control packet traffic processable by the intermediate multi-layer switching apparatus to establish a voice-related call session between the first and second authenticated communication devices and medium packet traffic indicative of digitized voice data, said method including the steps of:
(i) establishing a call session between the first and second authenticated communication devices via the intermediate multi-layer switching apparatus based on call control packet traffic received from the first authenticated communication device where the intermediate multi-layer switching apparatus determines that a data rate of said call control packet traffic is below a prescribed data rate threshold; and
(ii) splitting medium packet traffic communicated from the first authenticated communication device towards the second authenticated communication device via the intermediate multi-layer switching apparatus during the established call session between the first and second authenticated communication devices, into a first call segment and a second call segment wherein said splitting of medium packet traffic includes performing at least Layer-3 processing of said medium packet traffic such that the first call segment is configured to originate from said first authenticated communication device and terminate at said intermediate multi-layer switching apparatus, and the second call segment is configured to originate from said intermediate multi-layer switching apparatus and terminate at said second authenticated communication device,
wherein packetized traffic received by the multi-layer switch during the established call session between the authenticated first and second communication devices is processed by an ingress filter of the multi-layer switch based on at least one switching rule that allows only voice-related call control packet traffic and medium packet traffic received from the first and/or second authenticated communication devices, the packetized traffic is processed to be onwardly switched between the first and second authenticated communication devices via the multi-layer switch while restricting non-voice related packetized traffic from being communicated between the first and second authenticated communication devices via the multi-layer switch, and said at least one switching rule allowed automatic activation in response to establishment of the call session and automatic deactivation in response to termination of the call session.

* * * * *